United States Patent [19]

Sikes et al.

[11] Patent Number: 5,043,904

[45] Date of Patent: Aug. 27, 1991

[54] WEB HANDLING APPARATUS MONITORING SYSTEM WITH USER DEFINED OUTPUTS

[75] Inventors: Dale R. Sikes, Burlington, Mass.; Robert L. Kopesky, Streamwood, Ill.

[73] Assignee: Web Printing Controls Co., Inc., Barrington, Ill.

[21] Appl. No.: 514,376

[22] Filed: Apr. 27, 1990

[51] Int. Cl.[5] ........................ G06F 15/46; B65H 23/00

[52] U.S. Cl. .................................... 364/469; 101/248; 226/1; 364/188

[58] Field of Search ............... 364/469, 138, 139, 188, 364/189, 468, 470, 471; 226/1, 2, 10, 24, 28, 100, 27, 29; 101/248; 358/101, 107

[56] References Cited

U.S. PATENT DOCUMENTS

| | | | |
|---|---|---|---|
| 4,318,176 | 3/1982 | Stratton et al. | 364/469 |
| 4,346,446 | 8/1982 | Erbstein et al. | 364/469 X |
| 4,639,881 | 1/1987 | Zingher | 364/188 X |
| 4,794,453 | 12/1988 | Gnuetchtel et al. | 358/101 |
| 4,839,814 | 6/1989 | Steidel | 364/469 |
| 4,847,775 | 6/1989 | Roch et al. | 364/469 |

*Primary Examiner*—Joseph Ruggiero
*Attorney, Agent, or Firm*—Welsh & Katz, Ltd.

[57] ABSTRACT

Apparatus and method particularly suitable for use with the closed loop color to color registration system of a commercial web printing apparatus providing automatic monitoring of user selected press conditions and disturbances and corresponding user defined outputs. The apparatus comprises a processor and other hardware for detecting press conditions and disturbances, for permitting operator selection of press conditions to be monitored and for permitting operator assignment of selected press conditions to a selected output port. Multiple types of outputs can be selected for each assigned port including latched, non-inverted, inverted, pulsed and delayed outputs. The selected press conditions are monitored and the selected output type is generated on the assigned port in response to occurrence of the selected press condition. Temporary and permanent masks may be assigned to any selected condition to inhibit output and a selection of active time windows may also be specified.

20 Claims, 4 Drawing Sheets

WEB HANDLING APPARATUS MONITORING SYSTEM WITH USER DEFINED OUTPUTS

BACKGROUND OF THE INVENTION

This invention relates generally to the field of commercial web printing apparatus and more particularly to an automatic web handling apparatus monitoring system, particularly suitable for use with a color to color register system, for monitoring press conditions and disturbances and for providing corresponding user defined outputs.

Automated web registration in commercial web printing environments is well known in the prior art. Of particular interest are multi-color printing machines in which successive printing operations are performed in a plurality of colors on a moving web at successive repeat lengths. In such systems it is necessary that the locations on the web at which the successive printing operations are performed have a predetermined relationship to one another. Each printing operation applies a different color in a predetermined pattern to the web superimposed to form a desired multi-color image. To obtain high quality resolution in the final product it is necessary that the patterns printed be precisely aligned. This alignment is referred to as registration.

Automatic measurement and control of registration adjustment is widely used in the prior art to obtain the desired degree of accuracy. In one prior art system utilizing a CCD video camera, a video image of the signature of the web or a portion is acquired and processed by an automatic control system to identify registration marks and their locations. Such systems continuously monitor the printed web as it passes under the camera and can detect various press conditions and disturbances affecting the quality of the printed product long before the press operators are able to detect them. Existing register control systems and other web apparatus do not, however, permit press operators to utilize detected or detectable press conditions by monitoring these press conditions and defining outputs in response thereto.

It is accordingly an object of this invention to provide a novel method and apparatus for utilization in conjunction with a color to color registration system to monitor a printed web to detect press disturbances and provide user defined responses.

It is yet another object of the invention to provide a novel and reliable method and apparatus for detecting press conditions and disturbances in which the user may define responses to a preselected set of detected press conditions and disturbances.

Briefly, according to one embodiment of the invention, apparatus is provided for identifying press system disturbances and permitting users to define responses to selected press conditions and disturbances. The apparatus comprises means for detecting a plurality of web handling apparatus conditions (i.e., conditions of apparatus in a web printing system such as web printing presses and auxiliary press apparatus) and means for operator selection of desired web press system conditions from the plurality of press system conditions. In addition, means are provided for operator assignment of desired press system conditions to respective operator selected output ports and for selective operator assignment of corresponding masks to selected assigned conditions as well as means for operator assignment of one of a plurality of output types to each assigned port. Also provided are means for monitoring the assigned conditions and generating the assigned output type on the respective assigned port in response to detection of the respective assigned condition. The generation of the assigned output type on the respective port may be inhibited in response to a corresponding mask assigned to the respective assigned condition.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1A:
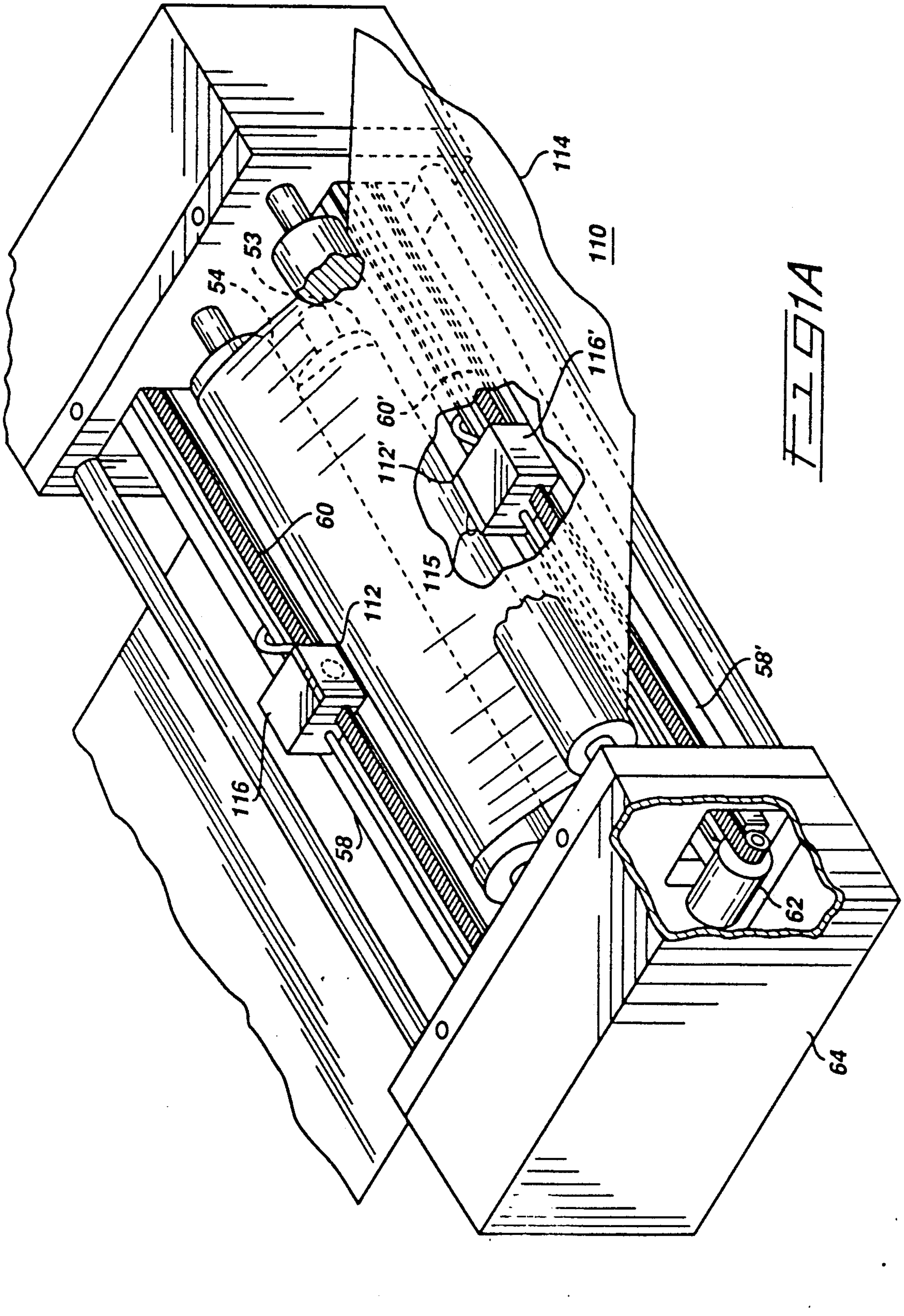
FIG. 1A is a pictorial view illustrating a specific embodiment of a color to color register control system suitable for use in conjunction with to the invention.

FIG. 1A is a pictorial view illustrating a specific embodiment of a web printing registration system 110 for inspection of a registration mark on a moving web surface 114 by video cameras 116, 116' suitable for use in conjunction with the invention. In the apparatus 110, high intensity, short duration illuminators 112, 112' (e.g., a conventional strobe light, a pulsed laser, etc.) is utilized to illuminate the surface 114 in order to stop the motion of a registration mark printed thereon to permit inspection and identification of a registration mark by the image acquisition cameras 116, 116' and the system 110. The cameras are belt driven by conventional stepper motors 62 (only one shown), which are controlled by an image processor 130 (see FIG. 1B) contained within the control circuitry enclosure 64, thereby enabling the processor 130 to control positioning of the cameras 116, 116'. Such a system is described in detail in U.S. Pat. No. 4,794,453 entitled "Method and Apparatus for Stroboscopic Video Inspection of an Asynchronous Event" issued Dec. 27, 1988 to H. Gnuechtel and S. Kosmen, which is hereby incorporated by reference, and such a system is marketed as the Microtrak CCR Model 9800 by Web Printing Controls Co., Inc., of Barrington, Ill.

Figure 1B:
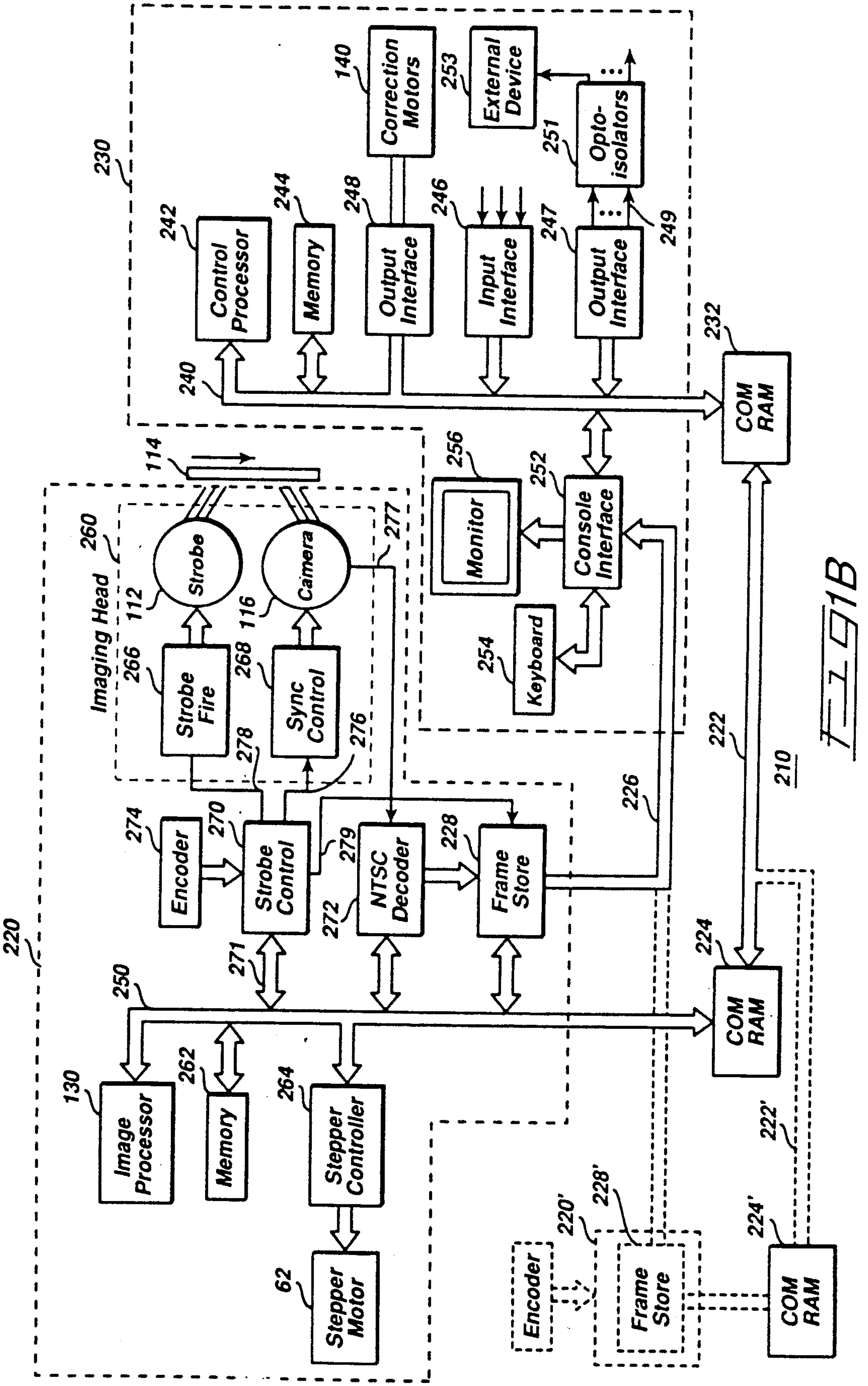
FIG. 1B is a block diagram illustrating a specific embodiment of automatic color to color register control apparatus with user defined outputs in accordance with the invention.

In operation, the cameras 116, 116' and the strobes 112, 112', under control of the control circuitry shown in FIG. 1B, acquire an image of a region 115 on the surface of the web which is the field of view (i.e., image field) of the cameras 116, 116' and within which the registration mark (not shown) is located at the time the strobe is fired. The image data generated by the camera in acquiring the image is coupled to the control circuitry within the enclosure 64 which analyzes the image data to extract information. This information is used to control registration correction motors 140 (see FIG. 3) to maintain color to color registration and is used to detect press disturbances.

Referring to FIG. 1B, there is shown a block diagram illustrating a specific embodiment of system circuitry 210 for the color to color registration system having press condition monitoring and user defined outputs according to the invention. The color to color register (CCR) control circuitry 210, and optional additional imaging circuits 220', permit use of multiple cameras (e.g., one for each side of the web as shown in FIG. 1A) with one control circuit 230. The imaging circuit 220 is coupled to a standard bus 222 through a dual port random access memory (e.g., comprising Hitachi HM6116's) which serves as a communications memory 224, as shown. Each additional imaging circuit 220' is coupled to the bus 222 through its own communications memory and bus as illustrated by the communications memory 224' and the bus 222'. Each imaging circuit 220, 220' also comprises a frame store circuit 228, 228' which is coupled to a frame store bus 226, as shown. The associated circuitry for each imaging circuit is identical to that of the image circuit 220. Therefore, the additional circuitry is not shown in detail and the description of the imaging circuit 220 is applicable to any additional imaging circuits 220'.

The imaging circuit 220 is coupled to the control circuit 230 via the bus 222 through a communications memory 232 which serves as a memory buffer for transfer of data to and from the imaging circuit communications memory 224. Thus, the communications memory circuits 224, 232 serve as interface buffers between the control circuit bus 240 and the imaging circuit bus 250.

The control circuit bus 240 may be a standard bus (e.g., in the illustrated embodiment a STD BUS, marketed by Pro-Log Corp.) for coupling a control processor 242 (e.g., in the illustrated embodiment a 7804A-O processor card as marketed by Pro-Log Corp.) to peripheral circuits. A memory 244 coupled to the bus 240 provides memory (both random access memory such as M5M5128 by OKI and read-only memory such as AMD2764 by Advanced Micro Devices) to provide program and data storage while an input interface 246 provides for input of additional data input to the processor 242 via the bus 240, as shown. A conventional optically coupled output driver 248 (e.g., a 065A optically coupled triac marketed by Opto-22) couples control signals generated by the processor 242 from the bus 240 to the correction motors 140 to control the correction motors and to thereby control color to color registration.

Also coupled to the bus 240 is a conventional console interface 252 which provides an interface between the bus 240 and a console keyboard 254, as well as a console monitor 256, as shown. This interface permits operator input (e.g., such as input of registration mark coordinates, operator selections, etc.) to the system circuitry 210 via the keyboard 254 and permits the operator to monitor the system operation. In addition, the console interface 252 couples video image data stored in the frame store memory 228 to the monitor 256 via the bus 226, as shown, thereby permitting the operator to view the acquired images of registration marks on the monitor 256.

The frame store memory 228 is also coupled to the bus 250 of the imaging circuit 220, as shown. The bus 250 is a standard bus (e.g., in the illustrated embodiment a STD BUS as marketed by Pro-Log Corp.) for coupling the image processor 130 (in the illustrated embodiment a 7804A-O processor card marketed by Pro-Log Corp.) to peripheral circuits. A memory 262 is coupled to the bus 250 to provide program and data memory for the image processor 130, and control signals generated by the processor 130 are coupled from the bus 250 to a stepper motor controller and driver 264, as shown. The stepper motor controller 264 drives the stepper motor 62 which positions the camera 116 and strobe 112 over the web as previously described with reference to FIG. 1A.

The video camera 116 and the strobe light 112 together with a strobe charge and fire circuit 266 and configured as shown, form an imaging head 260. The imaging head 260 communicates with the processor 130 and the frame store 228 via a strobe control circuit 270 and a conventional NTSC to cyan, magenta and yellow decoder 272. The strobe control circuit 270 and the NTSC decoder 272 are coupled to the processor through the bus 250 as shown. Also coupled to the strobe control circuit 270 is a position encoder 274.

To permit monitoring of press conditions and to permit the user defined output capability, a conventional output interface 247 is coupled to the bus 240 and, in the illustrated embodiment, provides thirty-two single line outputs ports 249. Each output is addressed and controlled by the control processor 242 via the bus 240 to output zero volts or 5 volts in the conventional manner. Each of the outputs 249 is coupled to a set of opto-isolators 251 with each output port 249 controlling one opto-isolator (e.g., a 065A optically coupled triac marketed by Opto-22) capable of switching an external device 253. The external device may be, for example, an audible alarm such as a horn, buzzer, bell or siren; a visual alarm such as a light, or strobe; or a tactile alarm. In addition, any other external device may be controlled, for example, controlling presses, auxiliary press units, divert gates, marking devices, etc.

In operation, the camera synchronization circuit 268 generates periodic scan (i.e., refresh) pulses necessary for proper operation of the camera's image sensor. A predetermined time before the registration mark is expected to be directly within the image field of the camera 116, the strobe controller 270 under control of the image processor 130 sets up the sensor (for acquisition of the desired image) during the predetermined time period prior to firing the strobe 112. At the end of the predetermined time period, the strobe 112 is triggered to illuminate the surface of the moving web 114 when the registration mark thereon is within the field of the camera 116. A predetermined time after the firing of the strobe the camera does an image acquisition scan of the image sensor. The video image data output from the camera 116 as a result of this image acquisition scan is coupled to the NTSC decoder 272 via a conductor 277 in FIG. 1B, as shown. The video image data, which represents the web surface where the registration mark is located, is decoded into pixels of cyan, magenta and yellow by the NTSC decoder. The decoded data is stored in the frame store memory 228 and used along with other input information to detect and control registration as well as determine various press conditions. These and other press conditions are periodically monitored and detection of operator selected press conditions trigger output ports 249 in accordance with operator output definitions.

Figure 2:
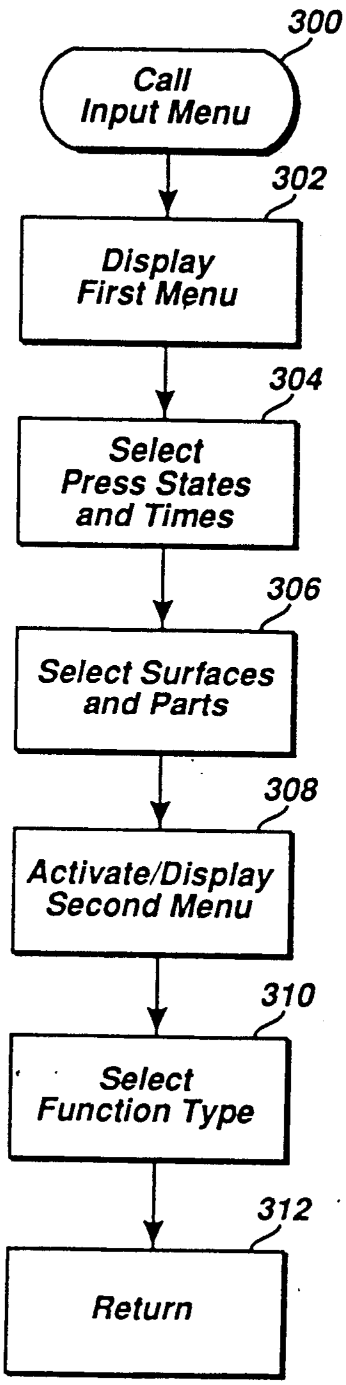
FIG. 2 is a generalized flow diagram illustrating the methodology and structural flow for a selection menu routine for permitting an operator to define selected press conditions to be monitored and to define corresponding outputs according to the invention.
Figure 3:
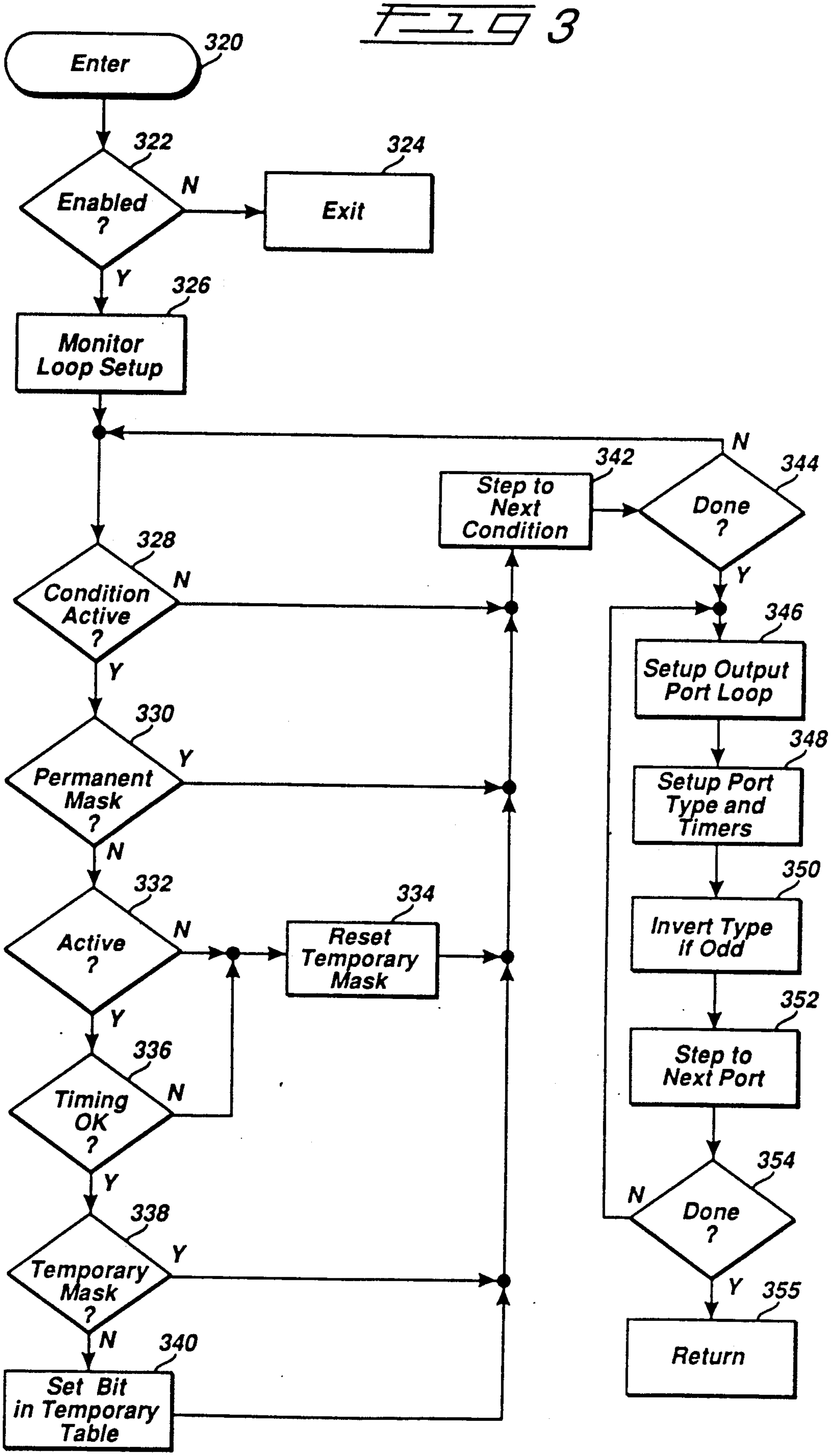
FIG. 3 is a detailed flow diagram illustrating the methodology and structural flow for a routine for a specific embodiment of the illustrated automatic press condition monitoring and user defined output system of FIG. 1B according to the invention.

The user defined monitoring and output system of the invention includes software routines (see FIGS. 2 and 3)

run by the processor 242. These routines permit the operator to select the specific press conditions which are to be monitored and if an occurrence of the condition is detected, the system triggers one of the output ports 249 thereby permitting control of an external device 253. The definition of press conditions to be monitored may be made by the operator by calling a selection menu routine (see FIG. 2) which permits the operator to select as active any of a set of available press conditions which can be detected. In the illustrated embodiment, the CCR system 210 detects various press conditions, 21 of which are made available for selection by the operator via the selection menu. However, in alternative embodiments, other press conditions may also be utilized in addition to those identified by the CCR system 210. Some of these press conditions may be designated for individual press units, or for individual webs or web surfaces in a press system (where a typical system comprises 2 webs, 4 web surfaces, and 8 to 10 press units). A press condition is selected as active by assigning it to one of the output ports 249 such that the designated port is activated by occurrence of the assigned press condition (i.e., the press condition detection is mapped to the assigned port).

In the illustrated embodiment, three timing parameters are permitted to be selected by the operator to account for the fact that a typical press system can be considered to run in a start-up mode and a run mode. In a start-up mode, the press is in transition to reach full speed and the imaging head locking onto the register marks, and once the register marks are locked onto, registration is accomplished by making large adjustments, while the run mode is the normal press operating mode wherein register is maintained automatically by continually making small adjustments. Thus, the user defined monitoring and output system permits the operator to designate a press condition as active during any one of three time periods (i.e., windows): (1) all the time, i.e., start-up and run mode; (2) during start-up mode only; (3) during run mode only. Thus each press condition selected is assigned a time parameter as well as an output port by the operator.

Each output port state can be modified by one of eight functions which are selected by the operator. These functions include operating the output in a normal state or in an inverted state, providing a pulsed output or an inverted pulsed output of fixed length which can be delayed a selectable period from the start of the triggering press condition, providing a delayed or an inverted delayed output, with selectable on and off delays, and finally a latch state or an inverted latch state with selectable on delay. As a result, software timers are provided which permit establishing the length of a pulse, a start or end delay of the delayed function, or an on delay for the pulse and latch functions.

Masking capabilities are also provided which permit the operator to activate a temporary mask which prevents the press condition from causing an output for the duration of the current active press condition. Thus, a temporary mask is used when a press condition has caused an output, for example, an alarm, and the operator desires to turn off the signal for the duration of the presently existing press condition. A permanent mask may also be assigned by the operator to prevent a condition from causing an output until the permanent mask is reset by the operator. The mask conditions are assigned by types of press conditions, thus those press conditions which permit assignment by web surfaces, webs, or units are masked universally (i.e., one mask for all webs, units, etc.).

In the illustrated embodiment, there are 21 types of press conditions which are made available for selection by the operator and which are as follows. A "control hardware" error is an error message which results from a detected hardware error or data error, for example, a check sum error, an error in the sixty cycle line frequency used for timing, or a RAM error. A "serial motor link down" error is generated when the CCR system 210 is connected to a central press computer which controls the register control motors. When the communications link between the CCR system 210 and the central computer is lost, this message is generated. An "image hardware" error is generated in response to a hardware test which checks the camera's position. This test steps the camera position and then counts position pulses to determine whether the camera is properly positioned. If an error in position is detected, the image hardware error is generated. An "image computer" error is generated when the image data communicated to the control processor from the image processor fails to pass the check sum test. An "image communications lost" error is generated when the communication link between the camera 116 and the control processor 242 is lost. A "bad input" error is generated when the operator enters an improper sequence of key inputs. A "unit assignment" error is generated if a press central console is used and has unit assignment numbers which are different than the unit assignment numbers used by the CCR system 210.

A "bad plate position" error is generated when opposite limits of the register correction motors on the same web are reached indicating the plates are improperly positioned. A "target position" error is generated when the register target is found in both the top and bottom surface of the web, but is more than a preset difference (e.g., half an inch) between the upper and lower surface. Each of these conditions are those which can be assigned only a single output port and which trigger the output port upon any surface generating the indicated error. An "impressions off" error is generated when the plate cylinder is not in contact with the blanket cylinder. For this error, a separate port can be designated for each web in the system (e.g., in a typical 2 web system, a separate port could be designated for the upper and the lower web). In addition, a single port could alternatively be designated to trigger when either web generates this error. A "unit at limit" error is generated when a press unit motor is driven to its limit. In the illustrated embodiment, this condition may have a single port assigned which is triggered in the event that any unit reaches a limit or, alternatively, may have a separate port assigned for each unit.

All the remaining press conditions which are available in the illustrated embodiment (of which there are nine) may have a single port assigned to be triggered when any one of the four web surfaces generates the selected press condition or, alternatively, may have each web surface separately assigned to a given port for the selected press conditions. The nine press conditions are as follows. A "start-up mode active" is a message generated when the system is in the start-up mode. A "targets pulled in" condition is a condition for each surface in which the target has been found and pulled into pattern such that the system has been able to switch to the run mode. An "out of tolerance" condition is generated if the press registration is more than a preset amount out of register so that the registration error is beyond the preset tolerance. A "targets not found" condition is generated if the register system 210 has been unable to find the target after a preset (e.g., 5 attempts) number of attempts to locate the target. A "targets found" condition will be generated for each surface when the target has been located. A "searching for targets" message is generated when the system is going through the preset number of attempts to find the targets during the set-up mode. The "imaging head in cleaning and calibration" is a message which is generated when the camera head is put in a home position used for calibration. A "calibrating" message is generated when the camera head is in the calibrating position and is being tested to calibrate its lateral zero position and registration mark identification function. A "calibration failed" message is generated when the calibration test is not successful. Each of the above described press conditions is available for selection by the operator as active conditions which can trigger an output port 249.

To select various press conditions and define outputs, the operator activates a designated key on the key board 254 to activate a selection menu routine which permits the operator to key in selections and related parameters. Referring to FIG. 2, there is shown a generalized flow diagram illustrating the methodology and structural flow for a selection menu routine of the automatic monitoring and user defined outputs for a specific embodiment of the system of FIG. 1B. The routine begins with the standard initialization of flags, etc., and other start-up inputs when the routine is called up by the operator as illustrated at block 300. A first selection menu is then displayed on the monitor 256 as indicated by block 302. As illustrated by block 304, this menu permits the operator to select as active any combination of the available press conditions (e.g., the above-described 21 conditions in the illustrated embodiment, although other press conditions may also be used) by assigning an output port to each desired condition. The operator further specifies one of the three time conditions (windows) when each selected press condition will be active by entering a zero for always (i.e., unrestricted window), a one for start-up mode, or a two for run mode for each selected press condition.

In the first menu, the operator assigns a port number to those press conditions for which the operator desires generation of an output if the condition occurs on any one of the web surfaces as indicated by block 306. For those conditions for which the option is available as previously described, the menu also provides for the operator to have the option of assigning a separate port number for each web, web surface or press unit. Thus, in the illustrated embodiment, the menu provides for assignment of a separate output port to each of the web surfaces for the nine press conditions previously described. In addition, the menu permits the "impression off" condition to be assigned to a separate port for the lower web and the upper web while providing for assignment of a separate port for each press unit for the "unit at limit condition."

After the first menu is completed, the operator may activate display of the second menu as indicated by blocks 308 which provides for selection of one of the eight function types and entry of time values for the software timers for each of the assigned output ports as indicated by block 310. Thus, in the illustrated embodiment, for each port, the menu permits the operator to assign a type number from zero to seven to specify the function type as follows: 0=normal; 1=inverted; 2=pulsed; 3=inverted pulsed; 4=delay; 5=inverted delay; 6=latch; and 7=inverted latch. In addition, the illustrated embodiment, the menu permits an on-delay (i.e., the delay from the onset of the monitored press condition until the output port is to be triggered) to be set for types 2 to 7; an on-time for types 2 and 3 (i.e., pulse width); and an off delay for types 4 and 5 (i.e., the time the output port remains in the triggered state after the monitored press condition has ended). Once these values have been provided, the menu routine terminates and operational control returns to the system software as illustrated by block 312.

One other screen that can be called at any time by the operator for display on the monitor by using a designated key on the keyboard 254 is an alarm screen. This alarm screen displays the press conditions which have been selected as active by the operator (i.e., all conditions assigned to an output port). In addition, any press condition that has occurred (i.e., the port has been activated) is marked, for example, in the illustrated embodiment by a red asterisk. In the alarm screen, the operator can also deactivate any port temporarily by assigning a temporary mask to the selected port, or permanently by assigning a permanent mask to the port. In the illustrated embodiment, a temporary mask assignment will cause the display of the associated press condition to be displayed in yellow until the mask expires, and a permanent mask assignment will change the display of the press condition to red until a reset is performed by the operator. These assignments are performed by the operator by moving a cursor next to the desired displayed press conditions and entering a one to to reset a previously set permanent mask, a two to assign a temporary mask and a three to assign a permanent mask.

Referring now to FIG. 3, there is shown a detailed flow diagram illustrated in the methodology and structural flow for a monitoring and output routine for a specific embodiment of the user defined automatic monitoring and output function. The routine is periodically entered (e.g., every 500 milliseconds) at block 320 after which a determination is made, as illustrated by block 322, to determine if the user defined automatic monitoring and output function has been enabled for use. The routine is exited if the function is not enabled as illustrated by block 324 and otherwise a condition monitoring loop of the routine is set up (i.e., initialization of pointers, counters, flags, etc.) and activated as indicated by block 326. This first loop of the routine constitutes a module which checks each press condition in sequence. Thus, as illustrated at block 328, the first press condition is checked (and subsequent conditions as the loop repeats) to determine if it is one of the operator selected active conditions (i.e., if it has been assigned an output port) and if not, the routine steps to the next press condition in the sequence of available press conditions, as indicated by block 342. If the result at block 328 is affirmative, a check is performed to determine if a permanent mask has been designated for the detected condition as illustrated at block 330. If a permanent mask has been designated, then the output port for that condition will not be activated and the routine steps to the next press condition, as indicated at block 342.

If a permanent mask has not been designated, then a check is performed (i.e., the active bit is checked) to determine whether the presently monitored press condition has been set active, indicating that the monitored condition has occurred. If the result is negative (i.e., the condition is not present), any temporary mask that was previously set for the press condition is reset as indicated at block 334 and the routine then steps to the next press condition in sequence indicated at block 342. If the active bit was set active, then a check is made of the timing condition, as illustrated by block 336, to determine if the press system is in the time period required for activation of the output port (i.e., any time, start-up mode, or run-mode). If the system is not in the designated mode, any temporary mask for the condition is reset and the routine steps to the next press condition, as indicated by blocks 334 and 342. If the system is in the designated mode, then a check is made to determine if a temporary mask has been designated for the detected condition, as indicated at block 338. If the result is affirmative at block 338, then no output port is activated and the routine steps to the next press condition, as shown by block 342. If the result at block 338 is negative, then an output bit for the designated output port is set in a temporary output condition table indicating that the port is to be activated, as indicated by block 340. Subsequently, the routine steps to the next press condition in the sequence of available press conditions, as indicated at block 342. Each time after stepping to the next press condition at block 342, a check is made to determine whether all available press conditions have been processed, as illustrated in block 344, and if the result is negative, process control returns to block 328 to evaluate the next detected condition (i.e., repeat the loop from block 328 to 342). A complete temporary output condition table of all ports (i.e., thirty-two in the illustrated embodiment) will thus be created as the condition monitoring loop is repeated.

If at block 344, all of the detected conditions have been processed, then the routine branches to an output port activation loop which is initialized and activated as indicated at block 346. This port activation loop separately handles each of the thirty-two ports using the temporary port condition table and sequentially services all output ports (i.e., all thirty-two in the illustrated embodiment). Operational control proceeds from block 346 to block 348 where an activated port of the temporary port condition table is set up as a normal, pulsed, delayed or latched port (i.e., port type is determined and set) and the appropriate timers are set up according to the selections made by the operator in the selection menus. The port output type is then inverted if the type number entered by the operator for that port is odd (i.e., an odd type number indicates an inverted output). Once the output port type set-up has been completed as at block 350, the routine steps to the next output port in the temporary port condition table as indicated at block 352. At block 354, a check is done to determine whether the processing of all output ports has been completed. If the result at block 354 is negative, processing flow returns to block 348 to process the next output port in the sequence. If all ports have been processed, the routine is exited as indicated by block 355. After a short period (500 multi-seconds in the illustrated embodiment), the entire monitoring and port activation process is repeated starting at block 320. Thus, on a periodic basis, each port state is reevaluated and set up according to current conditions.

Specific embodiments of the method and apparatus for monitoring press disturbances and providing corresponding user defined outputs in real-time has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any modifications, variations or equivalents that fall within the true spirit and scope of the basic underlying principles disclosed and claimed herein.

What is claimed is:

1. Apparatus for monitoring web handling apparatus and generating operator defined responses to detected conditions comprising:

means for detecting a plurality of web handling apparatus conditions;

means for operator selection of desired web handling apparatus conditions from the plurality of web handling apparatus conditions;

means for operator assignment of each of the desired web handling apparatus conditions to a respective operator selected output port to generate respective assigned conditions and corresponding assigned ports;

means for selective operator assignment of corresponding masks to selected assigned conditions;

means for operator assignment of one of a plurality of output types to each assigned port to provide an assigned output type;

means for monitoring the assigned conditions and for generating the assigned output type on the respective assigned port in response to detection of the respective assigned condition;

means for inhibiting the generation of the assigned output type on the respective assigned port in response to a corresponding mask assigned to the respective assigned condition.

2. The apparatus of claim 1 wherein the means for operator assignment of desired web handling apparatus conditions comprises means for selective assignment of conditions of individual press units to separate selected output ports.

3. The apparatus of claim 2 wherein the means for operator assignment of desired web handling apparatus conditions further comprises means for selective assignment of conditions of individual web surfaces and individual webs to separate selected output ports.

4. The apparatus of claim 3 wherein the means for operator assignment of desired web handling apparatus conditions further comprises means for selective assignment of a condition of any one of a set of all press units, web surfaces and webs to a single selected output port.

5. The apparatus of claim 1 wherein the means for assignment of masks comprises means for assignment of temporary masks which automatically expire when the web handling apparatus condition to which it is assigned terminates.

6. The apparatus of claim 5 wherein the means for assignment of masks further comprises means for assignment of permanent masks which remain until reset by the operator.

7. The apparatus of claim 1 wherein the means for assignment of output types comprises means for assignment of one of a direct output type, a pulsed output types, a latched output type and a delayed output type.

8. The apparatus of claim 7 wherein the means for assignment of an output type further comprises means for inverting any of the output types.

9. The apparatus of claim 1 further comprising means for operator selection of a time window for each assigned condition during which the generation of the assigned output type is enabled and means for disabling generation of the output type outside the time window.

10. The apparatus of claim 9 wherein the means for selection of a time window comprises means for selecting one of a run mode window, a start-up mode window and an unrestricted window.

11. A method for providing operator defined monitoring of web handling apparatus conditions, comprising the steps of:

detecting a plurality of web handling apparatus conditions;

providing for operator selection of desired web handling apparatus conditions from the plurality of web handling apparatus conditions and for assignment of each of the desired web handling apparatus conditions to a respective operator selected output port to generate respective assigned conditions and corresponding assigned ports;

providing for operator assignment of a corresponding mask corresponding to selected assigned conditions;

providing for operator assignment to each assigned port of one of a plurality of output types;

monitoring the assigned conditions and generating the output-type on the respective assigned port in response to detection of the assigned condition and the simultaneous absence of a corresponding mask.

12. The method of claim 11 wherein the step of providing for operator selection of desired web handling apparatus conditions comprises the step of selectively assigning web handling apparatus conditions of individual press units to separate selected output ports.

13. The method of claim 12 wherein the step of providing for operator selection of desired web handling apparatus conditions further comprises the step of selectively assigning web handling apparatus conditions of individual web surfaces and individual webs to separate selected output ports.

14. The method of claim 11 wherein the step of providing for operator assignment of a mask comprises the step of assigning of temporary masks which automatically expire when the web handling apparatus condition to which it is assigned terminates.

15. The method of claim 14 wherein the step of providing for operator assignment of masks further comprises the step of assigning permanent masks which remain until reset by the operator.

16. The method of claim 11 wherein the step of providing for operator assignment of output types comprises the step of assignning one of a direct output type, a pulsed output types, a latched output type and a delayed output type.

17. The method of claim 16 wherein the step of providing for operator assignment of an output type further comprises the step of inverting any of the output types.

18. The method of claim 11 further comprising the step of providing for operator selection of a time window for each assigned condition during which the generation of the assigned output type is enabled.

19. The method of claim 18 wherein the step of providing for selection of a time window comprises the step of selecting one of a run mode window, a start-up mode window and an unrestricted window.

20. Web press system monitoring apparatus for a web press system including at least one web printing press and associated auxiliary press apparatus having operator defined automatic monitoring of web press system conditions and operator defined responses to monitored conditions, comprising:

a color to color register system which scans at least one moving web surface within the press system and detects a plurality of press system conditions;

means for operator selection of desired press system conditions from the plurality of press system conditions;

means for operator assignment of each of the desired press system conditions from the plurality of press system conditions;

means for operator assignment of each of the desired press system conditions to a respective operator selected output port to generate respective assigned conditions and corresponding assigned ports;

means for selective operator assignment of corresponding masks to selected assigned conditions;

means for operator assignment of one of a plurality of output types to each assigned port to provide an assigned output type;

means for monitoring each assigned condition and for generating an active signal for the corresponding assigned port in response to occurrence of the respective assigned conditions and in the absence of a corresponding mask assigned to the respective assigned conditions, and for deactivating the active signal in response to the absence of the respective assigned condition;

means for generating the assigned output type on the respective assigned port in response to generation of an active signal for the corresponding assigned port and for deactivating the respective assigned port in response to deactivation of the active signal.

* * * * *